March 8, 1955 W. B. SMITH 2,703,474
DOFFING MECHANISM FOR COTTON PICKERS
Filed June 23, 1953 2 Sheets-Sheet 1

INVENTOR
William Burris Smith

BY Lee B. Kenon
ATTORNEY

March 8, 1955 W. B. SMITH 2,703,474
DOFFING MECHANISM FOR COTTON PICKERS
Filed June 23, 1953 2 Sheets-Sheet 2
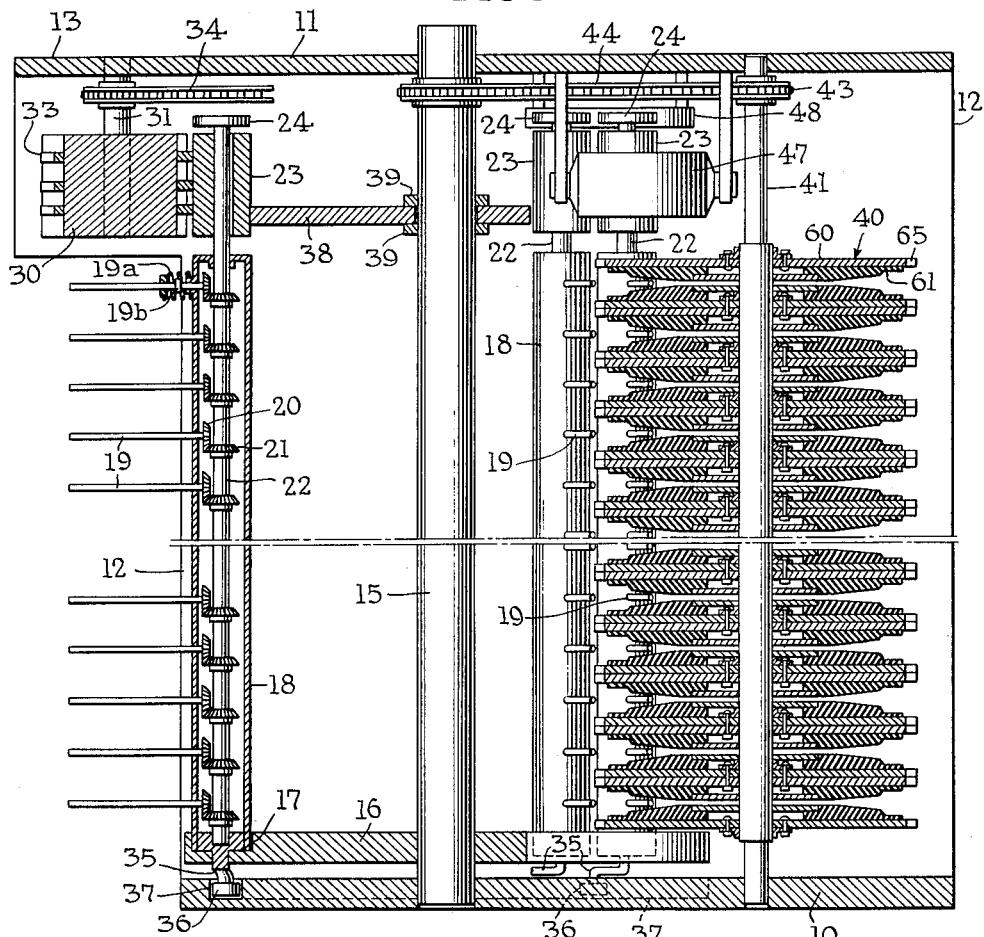
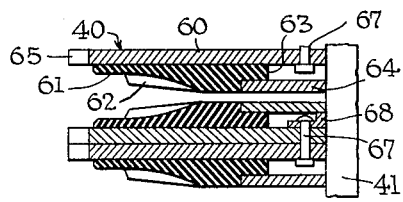
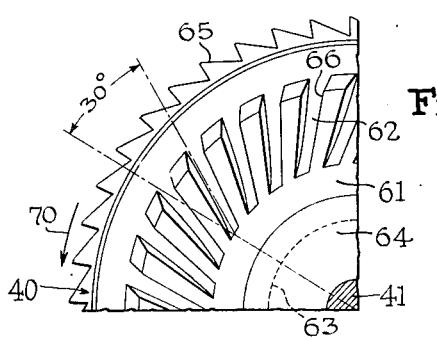
INVENTOR
William Burris Smith
BY Lee B. Kenon
ATTORNEY United States Patent Office 2,703,474
Patented Mar. 8, 1955

2,703,474

DOFFING MECHANISM FOR COTTON PICKERS

William B. Smith, Greenville, Miss., assignor of one-half to Lyne S. Gamble, Greenville, Miss., executor of Hugh A. Gamble, deceased Application June 23, 1953, Serial No. 363,564

4 Claims. (Cl. 56—47)

This invention relates to improvements in rotating spindle type cotton pickers and more particularly to an improved doffing mechanism for such pickers. This application is a continuation-in-part of my application Serial No. 206,040, filed January 15, 1951, now U. S. Patent No. 2,692,469.

The spindle type cotton picker as shown, for example, in Patent No. 1,747,566 issued to Hiram N. Berry, February 18, 1930, comprises a plurality of rotary picking spindles supported by and projecting from a rotary drum or cylinder. The drum is rotated on a vertical axis and moved along the side of a row of cotton plants while rows of rotary picking spindles are successively projected into the plants to wind off the cotton. In the Berry patent construction the picked cotton on the spindles is removed or doffed from the spindles by vertical stripper bars moved along the spindles after the spindles pass out of the plants. It has also been proposed to utilize rotary doffing devices for brushing or stripping the picked cotton from rotary spindles. The present invention provides a doffing mechanism which holds or stabilizes the picked cotton while the spindle is loosened and withdrawn from the picked cotton.

It is an object of this invention to provide an improved doffing mechanism which avoids the use of stripper bars and/or rotary brushes.

It is another object of this invention to provide a doffing mechanism effective to completely remove picked cotton from the picking spindles.

It is another object of this invention to provide a doffing mechanism which includes a plurality of elements interfitting between and engaging both sides of the cotton on the spindles of a vertical row of cotton-loaded spindles to hold and stabilize the cotton while the spindles are loosened and withdrawn from the cotton.

It is another object of this invention to provide a doffing mechanism which efficiently removes cotton from a flexibly mounted spindle which cannot be accomplished by engaging the cotton from only one side of the spindle.

It is another object of this invention to provide a doffing mechanism in which an improved spindle carrier draws rows of cotton-loaded spindles between a series of cotton stabilizing elements.

It is another object of this invention to provide an improved spindle drive mechanism which gives the loaded spindles a slight reverse rotation as they are drawn through the doffing mechanism.

It is a still further object of this invention to provide an improved spindle drive mechanism utilizing friction drive belts to rotate the picking spindles after they have penetrated the cotton plants and to reversely rotate the loaded spindles after they have left the plants and have engaged the improved doffing mechanism.

Other objects and advantages of this invention will be readily apparent to those skilled in the art from examination of the following description of a preferred construction illustrated diagrammatically in the accompanying drawings, wherein:

Figure 2 is a vertical sectional view taken along lines 2—2 in Fig. 1.

Figure 3 is an enlarged fragmentary vertical sectional view taken along lines 3—3 in Fig. 1 showing in detail the mounting of the rotary doffing members.

Figure 4 is a plan view of a portion of one of the doffing members.

Figure 1:
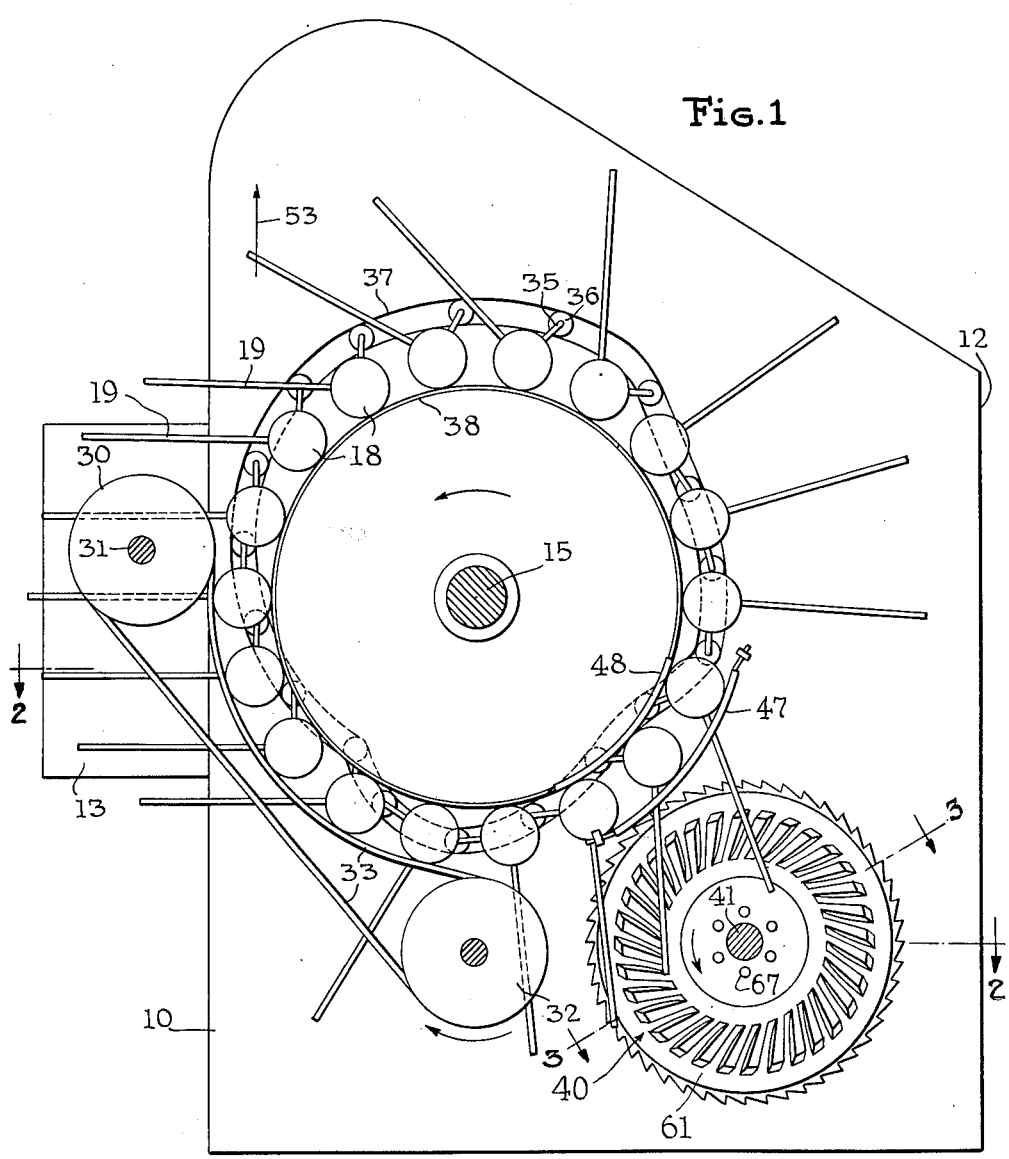
Figure 1 is a plan view with parts broken away and shown in section illustrating the principal mechanisms of a cotton picker unit embodying my invention.

For the sake of simplicity and clearness, some details and duplicated elements are omitted from the diagrammatic illustrations.

Referring to the drawings for the purposes of illustration, the base or floor of a cotton picker unit is indicated by the numeral 10. A top plate 11 may be secured to the base 10 by sides 12 and by a suitable framework, not shown. The entire unit is suspended from the top plate 11, which is flexibly connected to arms secured to a tractor or vehicle as is well known in the art. The top plate 11 has a projecting portion 13 to cover the projecting spindle drive pulley hereinafter to be described.

A rotary shaft 15 extends from a bearing in or supported by the base 10 vertically upward through the top 11 where it is connected by a gear or chain drive to a suitable source of power, not shown. The shaft 15 has a disc 16 secured thereto near the base 10, and the disc is provided near its periphery with a plurality of recesses 17. A series of vertical tubular housings 18 are provided and are supported by the disc 16, the lower end of each housing 18 being loosely seated in a recess 17. Each housing 18 is provided with a series of projecting cotton picking spindles 19. The circular series of housings 18 form a cage-like unit rotating about the vertical axis of shaft 15 to successively project and retract vertical rows of spindles 19 into and out of cotton plants as the unit passes along the side of a row of cotton plants. A typical picking unit may include a cage composed of eighteen housings 18, each housing carrying fourteen spindles, making a total of two hundred and fifty-two picking spindles per unit. A cotton picker may include two such units arranged in tandem.

The spindles 19 are preferably of the flexibly mounted type driven through a universal joint drive connection as shown and claimed in my copending application Serial Number 153,600, filed April 3, 1950, now Patent 2,672,-720. In such construction, the outer or picking portion of the spindle 19 is supported by a coil spring 19a extending outward from the housing 18, and the spindle is connected to its inner driven portion by a universal joint connection 19b. Each spindle 19 is driven by its bevel gear 20 engaging a gear 21 mounted on the shaft 22 within the tubular housing 18. Suitable bearings are provided in the housing 18 for the shaft 22, and a driven pulley 23 is secured to the top of the shaft 22 above the housing 18. A rotatable roller 24 is provided at the top end of the shaft 22 above the pulley 23. At the top of the cotton picker unit a pulley 30 is supported on a shaft 31 journaled in the projecting portion 13 of the top plate 11. A similar pulley 32 is supported in a similar manner rearward of the central shaft 15. Pulley 30 or pulley 32 may be adjustably supported to provide for adjustment of the tension of belts 33. The pulleys 30 and 32 are provided with grooves to receive a plurality of endless V-type belts 33 which extend around the pulleys and engage the pulleys 23 of those housings 18 having their spindles 19 penetrated into cotton plants. The shaft 31 is driven by a chain drive 34 indicated partially in Figure 2 and connected to the power source which drives central shaft 15. The outer surfaces of the belts 33 frictionally engage pulleys 23 for rotating the shafts 22 and spindles 19 as the latter are withdrawn from the cotton plants. A wheel 38 is supported on the drive shaft 15 between collars 39 so that the wheel 38 is free to rotate with respect to the shaft. The periphery of wheel 38 engages the driven pulleys 23 during the time the pulleys are engaged by the driving belts 33. The freely turning wheel 38 absorbs the inward radial thrust of the driving belts and relieves the shafts 22 and their bearings in the housings 18 from all stresses except driving torque. After a driven pulley 23 passes beyond the range of contact with belt 33, the housing 18 is biased radially outward by suitable springs so that its pulley 23 is no longer in contact with the periphery of wheel 38. As mentioned heretofore, the lower ends of the housings 18 are loosely seated in recesses 17 in the driven disc 16, so that the top of the housing 18 and its pulley 23 is permitted to swing slightly off vertical. The housings swing inward when the drive belts 33 urge the pulleys 23 against the free wheel 38, and may swing outward away from contact with the wheel 38 when beyond the limited extent of the driving belts 33.

Each tubular housing 18 is provided at its lower end with a rigid arm 35 secured thereto and extending below the disc 16, the arms 35 projecting laterally from the vertical axis of the shaft 22 in a direction at right angles to the axis of the spindle 19. The outer end of the arm 35 carries a roller 36 which engages a cam track 37 in or secured to the base plate 10. The cam track 37, as shown diagrammatically in Figure 1, extends forwardly of the path of travel of the housings 18 on the forward side of the unit, and extends rearwardly of the path of travel of the housings 18 on the rearward side of the unit. The shape of the cam track 37 is such as to slightly turn the housings in their circular path of travel about the shaft 15 so that the vertical rows of spindles 19 penetrate into the cotton plants and are withdrawn from the cotton plants in a substantially parallel row relationship as the picker moves along the side of a row of cotton plants. The cam track 37 is also shaped to move the housings 18 so that the loaded spindles 19 are drawn through the stabilizing and doffing mechanism hereinafter described, with a wiping movement. The friction belts 33 engage the pulleys 23 after a row of spindles has fully penetrated the plants and continues to rotate that row of spindles while it is being withdrawn from the plants.

The stabilizing and doffing mechanism includes a vertical series of members comprising disc-like elements 40 spaced along and secured to a support in the form of a vertical shaft 41, the latter being journaled in bearings in the top plate 11 and bottom plate 10.

The disc-like elements 40 may be formed by molding a somewhat resilient rubber-like material 61, such as the rubber substitute prepared from chloroprene and known as "Neoprene." The material 61 is molded upon or bonded to a suitable support disc 60 as shown in Figures 3 and 4 to form an annular surface. As shown best in Figure 3, each element 40 comprises a backing disc 60 supporting an annular resilient member 61, the latter having one side secured to the backing disc 60 and having its other side formed with a plurality of grooves 62. The central portion of the member 61 is formed with a flange 63 engaged by a filler disc 64. The backing disc 60 and the filler disc 64 may be formed from metal or plastic, and the phenolic laminated material known as "Micarta" is particularly suitable. The backing discs 60 have a notched or saw-tooth periphery 65 to prevent cotton or other material from jamming between the discs and the wall leading to suction pipe, and to quickly remove any foreign matter that may tend to block the entrance of spindles between the doffing discs. The grooves 62 formed in the exposed surface of members 61 preferably intersect the radii of the members 61 at an angle of about thirty degrees, and the cross section of each groove 62 is preferably rhombic in shape to form an acute angle edge 66 facing toward the direction of disc rotation 70. An acute angle edge 66 has been found particularly effective in that when edges 66 contact cotton on a spindle, the sharp edges turn backward and in toward spindle, thereby gripping the cotton more tightly for more efficient stabilizing and holding during removal of the spindle from the cotton. Adjacent backing discs 60 of a pair of elements 40 are secured back to back and fastened by rivets 67 or the like to a flanged collar 68 keyed or secured to the shaft 41. The supporting shaft 41 may be rotated by a drive sprocket 43 connected to the driven shaft 15 by a chain drive 44 or the like. The spacing between the opposed members 61 is somewhat greater than the diameter of the spindles 19 and is such that when a spindle 19 loaded with cotton fibers is drawn between two adjacent elements, the grooved material 61 will engage the cotton on both sides of the spindle and hold or stabilize the cotton. To further assist in loosening the stabilized cotton on a loaded spindle 19, a stationary belt 47 is mounted in the upper part of the unit for engagement with friction pulleys 23 carried by housings 18 whose spindles 19 are drawn between elements 40. A stationary segmental cam 48 is rigidly supported near the top of the unit to engage the free rollers 24 above the top of such housings to swing the top of the housings 18 outward so the pulleys 23 will positively engage the fixed belt 47. The latter causes the pulleys 23 to slowly rotate the spindles a partial turn in a reverse direction of rotation to the winding rotation effected by belts 33, whereby the cotton fibers wound on the spindles are partially unwound or loosened from the spindle barbs as the spindle passes between elements 40.

Referring to the diagrammatic illustration of Figure 1, during operation of the picking unit, the unit moves forward along the side of a row of cotton plants in the direction indicated by arrow 53. In operation, the shaft 15 is driven counterclockwise turning the disc 16 counterclockwise to move the spindle housings 18 counterclockwise around a circular path. The cam 37 turns the housings 18 so that the vertical rows of spindles 19 penetrate into the sides of cotton plants in substantially parallel rows. After a vertical row of spindles has fully penetrated a plant, the drive belts 33 driven clockwise engage the pulleys 23 to rotate those spindles. Rotation of the spindles ceases when a row of spindles reaches the rearward side of the unit and pulley 23 passes beyond the belt pulley 32. The stabilizing elements 40 may be rotated counterclockwise, and when the loaded spindles enter between opposed members 61, the pulley 23 connected thereto is urged against the stationary belt 47 by cam 48 engaging rollers 24, thus causing the loaded spindles to be rotated about half a turn in a reverse direction, tends to unwind and loosen the cotton fibers from the spindles. The engagement of flat surfaces of member 61 with both the top and bottom sides of the cotton on the spindles causes the cotton fibers to be loosened and stabilized. The withdrawal of spindles coupled with rotary motion of discs 40, and the contact of the cotton fibers with the grooved portion of the doffers causes efficient removal of the cotton fibers from the spindles. The loose cotton fibers are thrown outward by the rotating elements 40. The loose cotton may be collected by suitable shields and pneumatic blowers, not shown, which convey the loose cotton fibers to receptacles carried by the picking unit, as is well known in the art.

The limited reversal of the spindles and the partial unwinding of the cotton, together with the stabilizing engagement of the grooved "Neoprene" elements 61 with the cotton fibers on both the top and bottom side of each spindle, has been found particularly effective to completely release the cotton from the spindles. The flexible spindles disclosed in my copending application are particularly effective when used with the present form of stabilizing and doffing mechanism. Engagement of the doffing elements with both the top and bottom sides of the cotton fibers on the spindles has been found to be considerably more effective than rotary brushes or stripper bars. The friction belt drive for the spindle rows has also been found superior to the gear and/or chain drives heretofore used because the friction permits slippage without breakage if a spindle becomes jammed or locked.

While the foregoing describes a preferred embodiment, this invention contemplates the use of various forms of bearings, supports, drive connections, and the like, as it will be readily apparent to those skilled in this art that many such variations are possible within the scope of the following claims defining my invention.

I claim:

1. In a cotton picker movable along a row of cotton plants and having rows of spaced cotton picking spindles rotated while in the cotton plants, a doffing mechanism for engaging and holding cotton fibers wound on said spindles, said mechanism comprising in combination, a driven rotary shaft, a series of disc-like circular elements secured to and in spaced relation along said shaft, said elements being adapted to have said spindles pass therebetween, each of said elements having an annular surface of resilient material traversed by a series of outwardly extending grooves formed in said surface, said resilient material surfaces of adjacent elements being spaced apart from one another a distance greater than the diameter of that portion of said picking spindle passing between said surfaces, said grooved surfaces of any pair of opposed discs adapted to engage and doff cotton fibers from said spindles as said spindles pass outward from between said surfaces.

2. In a cotton picker movable along a row of cotton plants and having rows of spaced cotton picking spindles rotated while in the cotton plants, a doffing mechanism for engaging and holding the picked cotton fibers on said spindles, said mechanism comprising in combination, a driven rotary shaft, a series of annular elements secured to and in spaced relation along said shaft, each of said elements including a backing member and a surface member of resilient material secured to said backing member, said elements being spaced apart from one another a distance greater than the diameter of that portion of said picking spindle passing between said surfaces for said spindles to pass freely between a pair of said resilient material members, each of said resilient material members including an annular surface traversed by a series of outwardly extending grooves in the surface thereof, said annular surface and the grooves in any pair of said resilient members being adapted to engage and doff cotton fibers from said spindles as said spindles pass outward from between said resilient members.

3. In a doffing mechanism of the character defined in claim 2, said annular surface of said resilient material members having a series of outwardly extending ribs thereon defining straight grooves intersecting radii of said annular elements at an angle of the order of thirty degrees.

4. In a doffing mechanism of the character defined in claim 2, said backing members having a notched peripheral edge outward of the peripheral edge of resilient surface members.

References Cited in the file of this patent

UNITED STATES PATENTS

| | | |
|---|---|---|
| 1,801,996 | Benjamin | Apr. 21, 1931 |
| 2,247,682 | Hagen | July 1, 1941 |
| 2,654,202 | Millard | Oct. 6, 1953 |
| 2,654,203 | Parkerton | Oct. 6, 1953 |
| 2,664,688 | Nickla | Jan. 5, 1954 |